United States Patent [19]

Grundner

[11] 3,849,307
[45] Nov. 19, 1974

[54] POLYALKYLENE POLYAMINE-ALDEHYDE-KETONE CONDENSATION POLYMER FLOCCULANTS AND RETENTION AIDS

[75] Inventor: Warren Thorne Grundner, Vincentown, N.J.

[73] Assignee: Sybron Corporation, Rochester, N.Y.

[22] Filed: May 5, 1972

[21] Appl. No.: 250,832

Related U.S. Application Data

[62] Division of Ser. No. 69,178, Sept. 2, 1970, abandoned.

[52] U.S. Cl. .................................... 210/54, 210/10
[51] Int. Cl. ...................... C02b 1/20, B01d 21/01
[58] Field of Search .................. 210/54, 52–54, 210/10, 47; 260/64, 65

[56] References Cited
UNITED STATES PATENTS

| | | | |
|---|---|---|---|
| 2,272,783 | 2/1942 | Treboux | 260/584 |
| 2,442,989 | 6/1948 | Sussman | 210/24 |
| 3,377,274 | 4/1968 | Burke et al. | 210/54 X |
| 3,607,622 | 9/1971 | Espy | 210/54 X |

*Primary Examiner*—Thomas G. Wyse
*Attorney, Agent, or Firm*—Theodore B. Roessel; Roger Aceto

[57] ABSTRACT

Novel water-soluble polymers useful as flocculants, retention aids and dewatering aids are disclosed. The polymers are condensation products of polyalkylene polyamines, ketones and aldehydes.

4 Claims, No Drawings

POLYALKYLENE POLYAMINE-ALDEHYDE-KETONE CONDENSATION POLYMER FLOCCULANTS AND RETENTION AIDS

This is a division of application Ser. No. 69,178, filed Sept. 2, 1970, and now abandoned.

BACKGROUND OF THE INVENTION

This invention relates to water-soluble condensation polymers of polyalkylene polyamines, aldehydes and ketones and to methods of flocculating, dewatering and retaining suspended solids and sludges.

Many aqueous and non-aqueous systems have finely dispersed solid particles suspended in a fluid or liquid medium. Such systems include natural water containing suspended silt, spent wash water from the processing of minerals containing finely divided clay or other mineral products, waste water from the treatment of domestic sewage containing finely divided organic material suspended therein and a multitude of other systems consisting of finely divided solid particles suspended in a liquid phase.

It is well known that the finely divided particles suspended in a fluid medium will settle out due to the force of gravity in a period of time that is inversely proportional to their size. This invention is directed to those suspensions wherein the particles are of such small size that it would require an extended period of time for the settling to occur.

Filtration techniques which are often used to separate solid particles from a fluid medium, are of little value in separating such suspensions of finely divided solids from the fluid medium due to the entry of small particles into the pores of the filter media. The passageways through the filter become blocked allowing but slight, if any, passage of the liquid phase through them. These problems, however, may be effectively overcome by causing an agglomeration of the fine particles of such size as to preclude their entry into the pores of the filter media. Agglomeration causes an increase in particle size thereby increasing the weight and decreasing the period of time in which the suspended particles will settle out.

Agglomeration of the fine suspended particles occurs by the addition of certain substances to the suspension. These materials may be of either natural or synthetic origin and are usually employed in quantities relatively small in comparison with the amount of solid material in suspension. They are commonly referred to as flocculants, and the procedure of employing them in the agglomeration and settling out of fine particles from suspension is commonly referred to as flocculation.

The suspended solids can be removed in some cases by treatment with various inorganic materials, such as, lime, alum, aluminum sulfate, ferric chloride and the like. However, certain disadvantages are inherent in the use of these materials. Frequently, it is necessary to adjust the pH of the water to make treatment feasible, or such large quantities must be used that the water or liquid medium becomes undesirably contaminated with foreign ions. Since the inorganic flocculants are only effective in high concentrations, it is necessary to transport and store large quantities of these materials thereby resulting in an economic disadvantage.

A number of classes of water soluble organic polymers have been discovered as useful promoters of flocculation of suspended solids, dewatering and solids retention aids in aqueous media. One of those classes has been the polymeric condensates of polyalkylene polyamines. Cruickshank et al. in U.S. Pat. No. 3,219,578 show that a condensate of an alkyl dihalide and a polyalkylene polyamine will coagulate inorganic solids suspended in water. Garms in U.S. Pat. No. 3,275,588 teaches a terpolymer of ethylenimine, a polyalkylene polyamine and epichlorohydrin which has utility as a flocculant, and Schiegg in U.S. Pat. No. 3,391,090 discloses condensation products of polyalkylene polyamine and epoxyhalides which are useful as flocculants in water clarification. In a condensation reaction which converts substantially all the chlorine of epichlorohydrin to hydrogen chloride, Coscia in U.S. Pat. No. 3,248,353 prepares a condensate of a polyalkylene polyamine and epichlorohydrin which is crosslinked to a high molecular weight short of gelation which is found to be useful as a retention aid. The hydrogen chloride tends to inhibit the condensation reaction. In all of these cases where a polyalkylene polyamine is used to prepare a condensate, the particular condensate is a specifically tailored condensate prepared for a specific purpose. In U.S. Pat. No. 3,131,144, Nagan discloses a filtration process wherein turbidity and/or color are removed from water by addition of a condensate of an alkylene polyamine and a polyfunctional halohydrin without visible floc formation. Nagan also discloses a water soluble condensation product of polyalkylene polyamines and formaldehyde wherein polyamines are linked with a plurality of methylene bridges, but this particular condensate shows specificity for removal of turbidity from low turbidity water and requires extremely high concentrations for the appearance of a visible floc in the treated water.

It would be a distinct advantage to the art if a single class of simply prepared copolymer condensate would show activity in a variety of aqueous liquids requiring either flocculation, dewatering or solids retention, rather than specific tailoring of a copolymer condensate for each specific desired purpose.

OBJECTS OF THE INVENTION

Accordingly, it is an object of this invention to provide a means for facilitating the separation of solids suspended in a liquid medium by means of treatment with a polymeric amino-nitrogen containing substance simply prepared by the condensation reaction of a polyalkylene polyamine with a ketone and an aldehyde.

It is another object of this invention to provide a polymeric condensate of a polyalkylene polyamine an aldehyde and a ketone as an aid for the dewatering of sewage sludges, fibrous slurries or batters and other materials requiring at least one dewatering step in their manufacture.

It is another object of this invention to provide a condensate of a polyalkylene polyamine, an aldehyde and a ketone as a flocculant to hasten the settling of finely divided particles dispersed in an aqueous medium and to serve as a solids retention aid.

SUMMARY OF THE INVENTION

I have found that reacting a polyalkylene polyamine, an aldehyde and a ketone in molar ratios of about 0.9 to 1.1 polyalkylene polyamine to about 0.9 to 1.1 ketone to about 1.8 to 3.0 aldehyde produces a viscous, water-soluble, condensation product which has utility as a flocculant, a dewatering aid and a retention aid. It is essential to avoid water insoluble resin to preparing the condensation product, and therefore, it is critical to add the polyalkylene polyamine, the aldehyde and the ketone within the specified ranges. In general, an aqueous solution of a polyalkylene polyamine cooled to ambient temperature is mixed with a ketone and an aldehyde and heated at 75°C to 100°C until the viscous product forms. The aldehyde and ketone are added to the polyalkylene polyamine solution over a period of time to prevent excessive heating due to the reaction exotherm. Subsequent to the final addition of ketone and aldehyde heat is externally applied. Tests conducted upon the water-soluble condensation products of this invention indicated utility of the viscous product as a flocculant, a dewatering aid and a retention aid.

DESCRIPTION OF THE PREFERRED EMBODIMENTS

A mixture of acetone and formaldehyde is added slowly (over a period of about 45 min.) to a premixed and cooled solution of tetraethylene pentamine. The materials are reacted at a temperature of about 90°C. for a period of 16 hours until the viscous condensation product is obtained. The final product is diluted to a solids content of approximately 25–50 percent. The preferred molar ratio of formaldehyde, acetone and tetraethylene pentamine is about 2.4:1.0:1.0, respectively.

Effectiveness of these condensation products in the flocculation of finely divided suspended material is most frequently a reflection of the molecular weight of the polymer and crosslinking of the polymer. However, because of the difficulty in determining molecular weight, the viscosity of the product, which may also be considered a measure of the polymer chain length and crosslinking, is used as an indicator of suitability of the condensate. The condensation polymerization must be carried sufficiently far to thicken or increase the viscosity of the resultant product. It is important to note that effectiveness is also related to water solubility in the case of flocculants, retention aids and dewatering aids, and too high a molecular weight or viscosity may result in condensate insolubility in water. Accordingly, caution must be exercised in choosing the reaction conditions and concentrations to prevent the formation of a water insoluble product.

The polyalkylene polyamines that may be used in the condensation reaction must have at least two amino-nitrogen groups. They include, for example, polymers of tetraethylene pentamine, diethylene triamine, iminobispropylamine, ethylene diamine, pentaethylenehexamine, cyclized polyalkylene polyamines, and the like. The preferred polyalkylene polyamine is tetraethylene pentamine. Polyalkylene polyamines having fewer ethylene amine ($-CH_2-CH_2-NH-$) groups than tetraethylene pentamine yield products with reduced effectiveness as flocculants although they are still useful for this purpose. It also appears that as the number of carbon atoms between the nitrogen atoms of the polyalkylene polyamine increases, there is a drop in flocculating efficiency although such polyamines also produce useful flocculants.

Since the final product is of a viscous nature, it may be diluted to provide for ease of handling. Dilution to a solids concentration of 25–50 percent produces a material of such viscosity as to be easily poured from the reactor and transferred from one container to another. Such initial dilution also facilitates subsequent dilution to practical working concentrations for applications to systems containing solids in suspension.

The condensate product of this invention is a long chain water soluble polymer. Although the exact chemical structure of the resultant condensation polymer has not been determined with certainty, it is known that approximately 2.0 moles of aldehyde are used for every mole of ketone and polyalkylene polyamine. It is also known that the units of these condensates connect by methylene bridges. Thus, it appears that each ketone unit is connected to each polyalkylene polyamine unit by means of a methylene bridge which is provided by the aldehyde. Accordingly, the basic structural unit is alkylene polyamine-methylene bridge-ketone-methylene bridge-alkylene polyamine-methylene bridge etc.

In general, the condensation reaction is carried out in an aqueous medium. However, other suitable solvents may also be used in this reaction. The amount of water or other solvent employed in the initial reaction may vary. However, the preferred amount is from one to three times the weight of the reactants.

The addition of reactants to the reactor is most conveniently carried out in the order described above, namely the ketone and aldehyde mixture are slowly added to the precooled polyalkylene polyamine in water. However, other addition sequences also produce materials suitable for the purpose of this invention. The precooled polyalkylene polyamine-water solution may be added to a mixture of aldehyde solution and ketone in the reactor. The ketone may be added to a premixed and cooled aqueous solution of polyalkylene polyamine and aldehyde in the reactor. Aldehyde solution may be added to a premixed and cooled aqueous solution of polyalkylene polyamine and ketone in the reactor.

The preferred aldehyde useful in this invention is 37 percent formaldehyde solution. However, paraformaldehyde, acetaldehyde and other aldehydes may be used in this invention.

The preferred ketone of this invention is acetone. However, other ketones such as methyl ethyl ketone and the like may be used to prepare the condensate of this invention.

The aldehyde to polyalkylene polyamine molar ratio may vary from 1.8 aldehyde per 0.9 to 1.1 polyalkylene polyamine to 3.0 aldehyde per 0.9 to 1.1 polyalkylene polyamine. The preferred molar ratio range of aldehyde to polyalkylene polyamine is 2.0 aldehyde to 1.0 polyalkylene polyamine to 3.0 aldehyde to 1.0 polyalkylene polyamine.

The ketone to polyalkylene polyamine molar ratio may be varied between 0.9 to 1.1 acetone per 0.9 to 1.1 polyalkylene polyamine with a preferred range of 1.0 ketone per 1.0 polyalkylene polyamine. Under normal conditions, a 1:1 molar ratio of ketone to polyalkylene polyamine is used.

Since it is critical to obtain a condensate product which is water soluble, it is critical to maintain reaction conditions and concentrations of reactants within ranges which prevent excessive crosslinking or excessive polymer chain length. The critical factors are concentration of aldehyde, polyalkylene polyamine and ketone; reaction temperature; and reaction time. Water solubility of the viscous condensate product depends upon control of these parameters. Given the critical concentration ranges for the condensate reactants, it should be within the purview of one skilled in the art to adjust the critical reaction time and temperature for the particular concentration of reactants.

The following examples are set forth to illustrate more clearly the principles and practice of the invention to those skilled in the art.

EXAMPLE 1

Preparation of Condensate

Into a sealed 10 gallon stainless steel reactor equipped with stirrer, thermometer, reflux condenser and addition port were placed 11.93 kg. of water and 5.805 kg. (30.66 moles) of tetraethylene pentamine (TEP). The resulting solution was cooled to 25°C and a mixture of 1.78 kg. (30.65 moles) of acetone and 5.971 kg. (73.49 moles) of a 37° percent for maldehyde solution were added over a period of 1.75 hours. The first two-thirds of the acetone-formaldehyde mixture was added over 0.75 hours. The temperature reached 65°C. as a result of reaction exotherm and externally applied heat. The balance of the mixture was added over a period of 1 hour while maintaining a temperature in the range of 65°–70°C. The reaction was allowed to continue for 16 hours at 93°–95°C. after the addition was complete.

The heating was discontinued and 6.812 kg. of cold water was added to the viscous material. The resulting mixture was filtered through a single layer of cheesecloth and cooled. The product, 32.75 kilograms, contained 24.8 percent solids. Upon dilution to a solids concentration of 20 percent, the viscosity of the resulting solution was found to be 33 centipoises at 22°C. The reactants were added at a molar ratio of 2.4 formaldehyde to 1.0 of acetone to 1.0 of tetraethylene pentamine (2.4:1:1). Test results are shown in Table I.

EXAMPLE 2

Several reactions using various polyalkylene polyamines were carried out in accordance with the method disclosed in Example 1. The polyalkylene polyamines utilized in various experiments were ethylene diamine, (ED), in iminobispropylamine (IBP) and diethylene triamine (DET). Molar ratios, temperature and other reaction conditions were identical with Example 1 above, unless shown otherwise in Table I. The viscous condensate products obtained from each reaction were diluted to working concentration of 0.1 percent for use in testing and are recorded in Table I.

Another set of reactions in which reaction temperature and formaldehyde, acetone, tetraethylene pentamine concentrations were varied, were conducted in accordance with the method described in Example 1. Test results and variables are shown in Table I.

EXAMPLE 3

Measurement of Flocculation

Into a 1,000 ml. graduated cylinder was placed 1,000 ml. of tap water. A sample of each condensate prepared in Examples 1 and 2 was diluted to a working concentration of 0.1 percent. A sufficient amount of the 0.1 percent condensate solution was added to the 1,000 ml. of water in order to provide a concentration of 1 part per million of condensate in the water. The pH was adjusted to about 6.7. Fifteen grams of a finely divided kaolinite was added to the graduate and dispersed through the liquid by vigorously shaking and inverting the covered graduate. The graduate was placed on a flat surface and illuminated from behind. The fine clay (kaolinite) particles were found to agglomorate and settle to the bottom of the graduate. The rate at which the particles settled was determined by observing the length of time required for the interface between the relatively clear supernatant liquid and the zone of settling particles to fall to a level representing 20 percent of the original liquid depth.

The test was repeated without the addition of the condensate, and the ratio of settling times with and without polymer addition was determined. This value of time with polymer addition divided by time without polymer addition is designated as the settling ratio. Settling ratios using 1.0 ppm of the condensate are shown in Table I. The settling ratio is calculated from the following formula:

$$\frac{\text{SETTLING TIME WITH POLYMER ADDITION}}{\text{SETTLING TIME WITHOUT POLYMER ADDITION}}$$

TABLE I

Table Illustrating Effectiveness of Various Condensates On Flocculation of Kaolinite

| Ratio of Formaldehyde: Acetone:Polyamine | Polyamine | Reaction Temp. °C | Water Solubility | Settling Ratio 1.0 ppm Condensate |
|---|---|---|---|---|
| 1:0:1 | *TEP | 75 | Soluble | 0.90 |
| 2.2:0:1 | TEP | 100 | Soluble | 0.75 |
| 2.2:1:1 | TEP | 100 | Soluble | 0.18 |
| 2.3:1:1 | TEP | 100 | Soluble | 0.19 |
| 2.4:1:1 | TEP | 95 | Soluble | 0.15 |
| 2.5:1:1 | TEP | 75 | Soluble | 0.32 |
| 3:1:1 | TEP | 75 | Soluble | 0.23 |
| 3:1:1 | TEP | 100 | Soluble | 0.28 |
| 3.5:1:1 | TEP | 75 | Insoluble | — |
| 4:1:1 | TEP | 75 | Insoluble | — |
| 2.3:1:1 | *DET | 100 | Soluble | 0.41 |
| 2.3:1:1 | *IBP | 100 | Soluble | 0.51 |
| 2.3:1:1 | *ED | 100 | Soluble | 0.50 |

*TEP = tetraethylene pentamine
*DET = Diethylene triamine
*IBP = iminobispropylamine
*ED = ethylene diamine Table I shows the settling ratio (settling improvement factor) for the condensates tested. The lower settling ratios are an indication of superior flocculation. The condensates having the lowest settling ratios, and therefore, the ones which demonstrate superior flocculation, are those made with tetraethylene pentamine (TEP). Table I points out various other polyalkylene polyamines (polyamines) which produce condensates having flocculating characteristics, but they are inferior to condensates made with TEP. Condensates made without acetone have very high (0.90 and 0.75) settling ratios, and are therefore, not suited to flocculation. Condensates having formaldehyde molar ratios of 3.5 or above are insoluble in water, and therefore, are not suitable as flocculants.

EXAMPLE 4

Four polymeric condensates were prepared with paraformaldehyde under reaction conditions as set forth in Example 1. All four reactions utilized a molar ratio of 2.2 paraformaldehyde to 1 acetone to 1 tetraethylene pentamine (2.2:1:1). In Batch A, the tetraethylene pentamine was added to the aqueous solution of paraformaldehyde and acetone. In Batch B, tetraethylene pentamine dissolved in water was added to a paraformaldehyde-acetone solution. In Batch C, the paraformaldehyde was added to an aqueous solution of tetraethylene pentamine and acetone. In Batch D, the paraformaldehyde was added to an aqueous solution of tetraethylene pentamine and acetone under an atmosphere of nitrogen. The results of these four reactions are shown in Table II below where the settling ratio for each Batch may be compared to the amount of polymeric condensate indicated as dosage in parts per million. The dosage in parts per million for each sample was 0.2, 0.4 and 1.0.

TABLE II

Condensation Product With Paraformaldehyde
Settling Ratio*

| Dosage (ppm) | Batch A | Batch B | Batch C | Batch D |
|---|---|---|---|---|
| 0.2 | 0.37 | 0.37 | 0.38 | 0.37 |
| 0.4 | 0.25 | 0.31 | 0.27 | 0.23 |
| 1.0 | 0.16 | 0.17 | 0.17 | 0.18 |

*Settling Time With Polymer Addition/Settling Time Without Polymer Addition = Settling Ratio Examination of Table II indicates that there is no significant difference in flocculating efficiency between the various batches, and that paraformaldehyde when utilized in the polymeric condensate demonstrates utility in this invention.

EXAMPLE 5

A polymeric condensate prepared in accordance with the method described in Example 1 had a molar ratio of formaldehyde:acetone:tetraethylene pentamine of 2.3:1:1. This condensate was used in the dewatering of an industrial sewage sludge which represented the waste formed by the mixture of discharges from chemical processes carried out in a large industrial chemical plant.

Five hundred ml. of a sludge containing 0.7 percent solids was placed in a 1,000 ml. graduate and a measured amount of polymeric condensate solution was added. The cylinder was closed and inverted several times for a period of 30 seconds. The mixture was allowed to stand for 60 seconds and the treated sludge was then poured on a nylon filter cloth in a Buchner funnel seated in a vacuum flask evacuated by a water aspirator. Ten minutes after pouring the sludge onto the filter, the vacuum was cut off and the filter cake removed from the cloth and examined.

Upon addition of the polymeric condensate to the sludge, a prominent agglomeration of the sludge particles was noted. The filtrate was clear and the filter cake formed on the filter had a relatively high solids content. Without polymer addition, the filtrate was almost black and the filter cake formed was watery with a low solids content. Table III below indicates the percent of solids in the filter cake when various polymeric condensate dosages were used. Polymeric condensate dosages are indicated in lbs. of polymer per ton of sludge solids in Table III below.

TABLE III

Dewatering of Sewage Sludge With Polymeric Condensate

| Polymer Dosage (lb. polymer/ton sludge solids) | % Solids of Filter Cake |
|---|---|
| 0 | 5.7 |
| 7.1 | 13.7 |
| 21.3 | 14.5 |

An examination of the data found in Table III shows the effectiveness of the addition of the polymeric condensate to sewer sludge from chemical process plants. A polymer dosage of 7.1 lbs. of polymer per ton of sludge solids resulted in a filter cake having 13.7 percent solids or a twofold increase in the percent solids retained in the filter cake when condensate is added to the sludge.

EXAMPLE 6

A batter of a fibrous perlite roof insulation material was prepared and stirred during the addition of a measured quantity of polymeric condensate prepared in accordance with the method described in Example 1. The batter was allowed to stand for 30 seconds and poured into a tank fitted with a screen on the bottom and a release valve to control the drainage of liquids from the bottom of the screen. Immediately after adding the batter, the release valve was opened and the time required for the water in the batter to drain through the screen and the cake retained thereon was measured. The results are presented in Table IV below where drainage time in seconds is compared with the polymeric condensate dosage in lbs. of polymer per ton of insulation material.

TABLE IV

Dewatering of Roof Insulation Batter
With Polymeric Condensate

| Polymer Dosage (lb polymer/ton of insulation material) | Drainage Time (seconds) |
|---|---|
| 0 | 17.2 |
| 1 | 16 |
| 2 | 12.3 |
| 5 | 9.5 |

The data of Example 6 as recorded in Table IV indicate the utility of the polyalkylene polyamine-aldehyde-ketone condensation products in improving the drainage of liquors from batters and materials of a similar nature.

EXAMPLE 7

Into a sealed stainless steel reactor equipped with a stirrer, thermometer, reflux condenser and addition port were placed 153.2 parts of tetraethylene pentamine and 160.8 parts of demineralized water. The temperature was reduced to 28°C. and a mixture of 47.1 parts acetone and 158.1 parts of 37 percent aqueous formaldehyde solution were added over a period of 45 minutes. Two-thirds of the mixture was added in the first 10 minutes of the addition period after which the temperature had risen to 59°C. The temperature was raised to 65°C. over the next 25 minutes followed by the addition of the remaining one-third of the acetone over a 10 minute period. The temperature reached 70°C. at the completion of the addition of the acetone.

The resulting mixture was heated over a period of 6 hours and was maintained at 93°C, for 4 hours after which 335.2 parts of demineralized water was added.

The product contained 24.6 percent solids. Upon dilution to a solids concentration of 20 percent the viscosity of the resulting solution was found to be 140 centipoises at 20°C. The reactants were added at a molar ratio of 2.4 formaldehyde to 1.0 acetone to 1.0 tetraethylene pentamine (2.4:1:1).

EXAMPLE 8

The condensate, having a molar ratio of 2.4:1:1 described in Example 7 was added to a paper pulp which was a bleached softwood sulfite refined to approximately 370 CSF. The pulp used in this run contained 6.0 percent R750 titanium dioxide ($TiO_2$, Rutile type). Two different series to determine pigment retention were run. One series utilized the condensate in the presence of 0.5 percent alum with the pulp slurry adjusted to a pH of 4.8. The other series consisted of the condensate alone in a pulp slurry adjusted to a pH of 7.0 with sodium hydroxide.

In each series, 1.0 lb. of condensate was used for every ton of pulp. The pulp tested was collected in sheets of four grams per eight inch square. The percent of added pigment retained and the percent of ash in each four gram per eight inch square sheet were determined by placing the four gram per eight inch square sheet in a furnace and heating. The results of both series are recorded in Table V below.

TABLE V

| Sample | PIGMENT RETENTION | | |
|---|---|---|---|
| | Alum | % Ash | % of Added Pigment Retained |
| Blank | 0% | 1.52 | 25.4 |
| Condensate | 0% | 4.59 | 76.3 |
| Blank | 0.5% | 3.72 | 61.9 |
| Condensate | 0.5% | 5.02 | 83.6 |

Analysis of Table V indicates the effectiveness of the condensate in increasing pigment retention over the untreated pulp slurry and the pulp slurry containing 0.5 percent alum. The data of Example 8 as recorded in Table V, indicate the utility of the polyalkaline polyamine-aldehyde-ketone condensation products in improving the pigment retention in paper pulps.

The above examples are not meant to limit the multitude of applications to which this invention may be directed. It is to be understood that although the invention has been described with specific reference to particular embodiments thereof, it is not to be so limited, since changes and alterations therein may be made which are in the full intended scope of this invention as defined by the appended claims.

I claim:

1. A process for removing finely divided suspended particles from aqueous liquids comprising:
   a. adding a water soluble condensation polymer of polyalkylene polyamine, an aldehyde and a ketone, said condensation polymer having molar ratios from about 0.9 polyalkylene polyamine, 1.8 aldehyde and 0.5 ketone, to about 1.1 polyalkylene polyamine, 3.0 aldehyde and 1.1 ketone to said aqueous liquid containing finely divided suspended particles to cause flocculation of the suspended particles and
   b. separating said liquid from said particles.

2. The process of claim 1 wherein about 0.001 ppm to about 5.0 ppm soluble condensation polymer is added to the aqueous liquid.

3. A process for dewatering a sludge comprising:
   a. adding a water soluble polyalkylene polyaminealdehyde-ketone condensation polymer having molar ratios from about 0.9 polyalkylene polyamine, 1.8 aldehyde and 0.9 ketone, to about 1.1 polyalkylene polyamine, 3.0 aldehyde and 1.1 ketone to a sludge containing water; and
   b. removing said water from said sludge.

4. The process of claim 3 wherein about 0.0012 percent to about 2.5 percent by weight of said water soluble polyalkylene polyamine-aldehyde-ketone condensation polymer is added to said sludge.

* * * * *